United States Patent [19]

Grosser

[11] 4,221,403
[45] Sep. 9, 1980

[54] THREE-POINT SAFETY BELT

[75] Inventor: Werner Grosser, Sulzbach, Fed. Rep. of Germany

[73] Assignee: Karl Schmidt GmbH, Neckarsulm, Fed. Rep. of Germany

[21] Appl. No.: 856,611

[22] Filed: Dec. 2, 1977

[30] Foreign Application Priority Data

Dec. 8, 1976 [DE] Fed. Rep. of Germany ....... 2655491

[51] Int. Cl.² .............................................. B60R 21/10
[52] U.S. Cl. ............................................................ 280/806
[58] Field of Search ........................ 280/744, 745, 747

[56] References Cited
U.S. PATENT DOCUMENTS

| | | | |
|---|---|---|---|
| 3,804,430 | 4/1974 | Fiala | 280/744 |
| 3,871,683 | 3/1975 | Otani | 280/744 |
| 3,937,487 | 2/1976 | Pech | 280/744 |
| 3,982,775 | 9/1976 | Lindblad | 280/744 |

*Primary Examiner*—Robert R. Song
*Attorney, Agent, or Firm*—Sprung, Felfe, Horn, Lynch & Kramer

[57] ABSTRACT

Disclosed is an improved three-point safety belt for use in an automobile having a body containing a door where the three-point safety belt is secured at one end to the body and at the other end to a region of the body proximate the door. The three-point safety belt comprises an automatic winder and a pelvis strap mount, the pelvis strap mount being connected to a first prestressed spring, the mount being slidably mounted on a rod having on at least one side thereof engaging means. The mount has connected thereto cooperating engaging means for engaging the engaging means on the rod. The mount cooperating engaging means engages the engaging means on the rod when the mount is urged toward the spring. The mount is mounted against a release mechanism responsive to a threshhold deceleration, whereby when the threshhold deceleration is exceeded, the release mechanism releases the mount and allows the same to slide on the rod.

3 Claims, 3 Drawing Figures

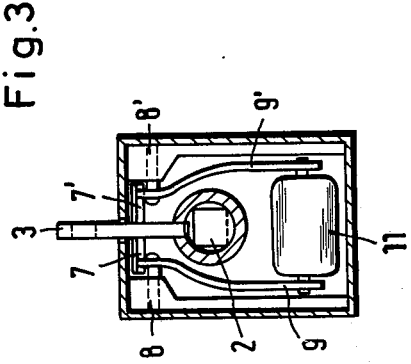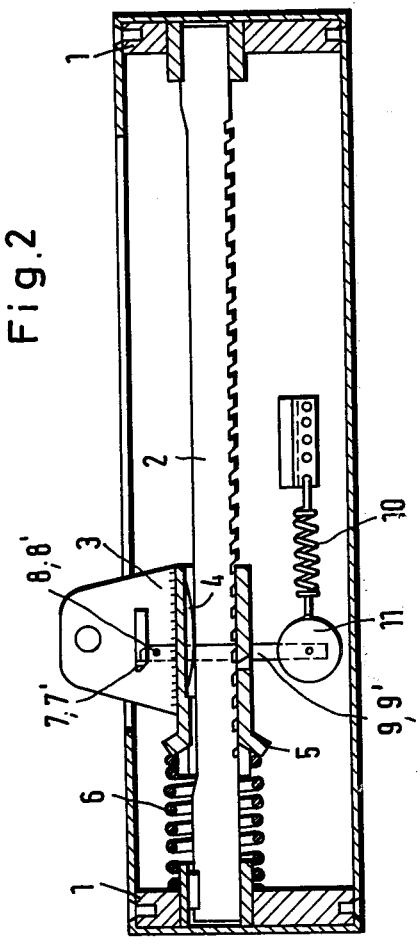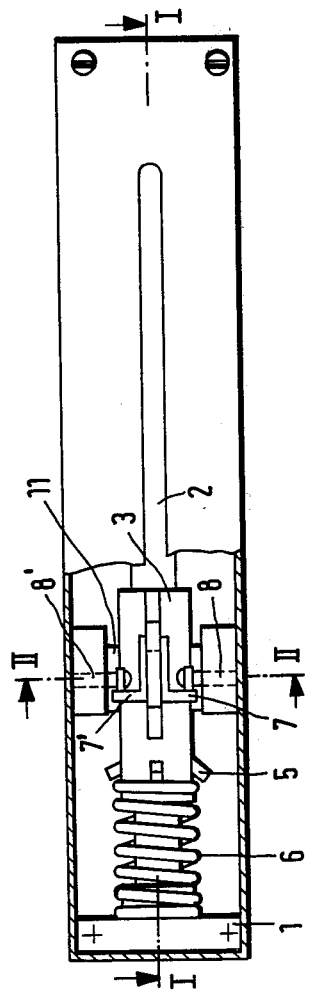

THREE-POINT SAFETY BELT

This invention relates to a three-point safety belt comprising an automatic winder and a pelvis strap mount, which is preferably mounted on the doorsill.

The experience of many years has shown that a three-point safety belt very effectively reduces or even eliminates the danger for the occupants of an automobile. When accidents were analyzed in that respect, it was found that strapped occupants do not suffer lethal injuries at speeds below 100 km/h and that the frequency of injuries is much reduced and there is virtually no danger of an occupant being thrown out of the car.

One of the functions of the three-point safety belt is to minimize the acceleration of the occupant and its forward displacement during a collision in that the deceleration of the occupant is initiated at the very beginning of the crash, if possible. For this reason, the required functions will be most effectively accomplished by a safety belt which causes the occupant to participate in the deceleration of the vehicle as soon as the crash begins and which particularly keeps back the lower portions of the body so that a diving of the occupant is avoided.

It has been proposed in ATZ 74 (1972) 3, on pages 124 to 128 to solve that problem, inter alia, by the provision of a safety belt combination consisting of an oblique shoulder strap and a knee strap. At the beginning of the crash, the oblique shoulder strap and the knee strap, which is integrated with the dashboard, are jointly retracted and prestressed by a hydraulic system or a small gas motor. As a result, the occupant can participate in the deceleration of the vehicle soon after the crash has begun. Both straps incorporate strap force limiters, which are intended to ensure a controlled forward displacement of the occupant.

The provision of auxiliary motors for prestressing the belt involves a considerable expenditure.

It is an object of the present invention to provide a conventional three-point safety belt which has an automatic winder and is provided with comparatively simple means which cause the lower portion of the body to be retained in the seat at the beginning of the crash so that a diving and an excessive forward displacement of the occupant are avoided.

This object is accomplished in that the pelvis strap mount is prestressed in its initial position by a spring and is slidably mounted on a suitably fixed rod and provided with a back stop and is connected to a release mechanism, which becomes effective shortly before the beginning of a crash. The threshold deceleration of the release mechanism is larger than the deceleration which causes the straps to be blocked and is adjustable.

According to a preferred feature of the invention the release mechanism consists of a pawl, which is connected to a prestressing spring and engages a cam, which is mounted on the pelvis strap mount.

The rod for guiding the pelvis strap mount is suitably formed on its underside as a rack, the teeth of which automatically prevent a return movement of the mount in case of a deceleration.

The release function of the pawl is adjustable and depends on a weight, which is provided at the lower end of the pawl and on the force of the prestressing spring.

The invention is illustrated on the drawing and will be described more fully hereinafter.

FIG. 1 is a top plan view,
FIG. 2 a longitudinal sectional view taken on line I—I in FIG. 1, and
FIG. 3 a transverse sectional view taken on line II—II in FIG. 1.

A rack 2 is secured in a doorsill 1. A pelvis strap mount 3 is slidably mounted on the doorsill 1, with a sliding spring 4 interposed. A prestressed coil spring 6 is disposed between an abutment 5, which is disposed at the front end of the mount 3, and the opposite fixture connecting the rack 2 to the doorsill 1. The mount 3 is provided with stops 7, 7', which interlock with pawls 9, 9', which are pivoted on pivots 8 and 8', respectively. A weight 11 is secured to the lower end of the pawls 9, 9' and is connected to a spring 10.

An adjustable threshold deceleration which exceeds the deceleration that causes the safety straps to be blocked depends on the mass of the weight 11 and on the spring force of the prestressed spring 10 connected to the weight 11. In response to said threshold deceleration, the pawls 9, 9' turn about their pivots 8, 8' to release the mount 3 so that the latter is displaced opposite to the direction of travel by the spring force exerted by the coil spring 6. That displacement is terminated when the end position has been reached or when the spring force is opposed by an equal force exerted by the safety belt on the mount.

As long as the stress of the safety belt causes an upwardly directed force component to be exerted on the mount, the latter cannot move to the front because the rack is formed on its underside with teeth and the mount is provided on the opposite side with mating teeth. After a release, the mount can be prestressed in a simple manner by the application of pressure to the mount in a downward vertical direction so that the force of the slidable spring disposed between the top of the rack and the opposite side of the mount is overcome and, as a result, the mount and the rack are no longer in mesh with each other. As the mount is pushed back to its initial position, the stop provided on the mount slides over the pawl so that the latter engages the stop from behind and retains the mount in its prestressed position.

The rack may be alternatively mounted in a separate housing.

I claim:
1. An automobile having a body, a door abutting a door arrester, a door arrester, and a three-point seat belt, which three-point seat belt comprises:
   A. a two-piece pelvis belt comprising a first piece and a second piece each of which in turn comprise a first end and a second end, the second ends of each piece being secured to said car, the first ends of each piece being interconnectable by clasp means with one another, which clasp means comprises an insertion member and a receiving member;
   B. a diagonal belt connected at one end to an automatic winder which in turn is connected to said car in the region of said door arrester and at the other end to a first end of a first piece of said pelvis belt, said first piece bearing at its first end an insertion member of a clasp, the second piece of said pelvis belt bearing at its first end a receiving member of a clasp;
   C. the second end of said first piece being connected to said car via a pelvis strap mount;
   D. said pelvis strap mount being connected to a first pre-stressed spring, said mount being slidably mounted on a rod having on at least one side thereof an engaging means, said mount having connected thereto cooperating engaging means for engaging said engaging means on said rod when said mount is urged in the travel direction of said automobile, said mount mounted against a release mechanism responsive to a threshhold deceleration whereby when the threshhold deceleration is exceeded said release mechanism releases and said mount slides on said rod.

2. An apparatus according to claim 1 wherein said release mechanism drives a pawl engageably connected to a stop carried on said mount, said pawl descending from said mount and having on its opposed end a weight connected to a second prestressed spring.

3. An apparatus according to claim 1 wherein said engaging means comprises a rack and said cooperating engaging means comprises teeth which mate with said rack.

* * * * *